(12) United States Patent
Lam et al.

(10) Patent No.: US 11,444,691 B2
(45) Date of Patent: Sep. 13, 2022

(54) OPTICAL FREE SPACE COMMUNICATION APPARATUS USING POLARIZATION

(71) Applicant: NORTHROP GRUMMAN SYSTEMS CORPORATION, Falls Church, VA (US)

(72) Inventors: Daniel W. Lam, Gardena, CA (US); James M. Zamel, Rolling Hills Estates, CA (US); Arthur B. O'Connor, Tucson, AZ (US); Donald G. Heflinger, Torrance, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 17/199,931

(22) Filed: Mar. 12, 2021

(65) Prior Publication Data
US 2022/0158727 A1   May 19, 2022

Related U.S. Application Data

(60) Provisional application No. 63/115,764, filed on Nov. 19, 2020.

(51) Int. Cl.
*H04B 10/11* (2013.01)
*G02B 27/28* (2006.01)
(Continued)

(52) U.S. Cl.
CPC ............ *H04B 10/11* (2013.01); *G02B 27/141* (2013.01); *G02B 27/285* (2013.01); *G02B 27/286* (2013.01); *H04B 10/532* (2013.01)

(58) Field of Classification Search
CPC ..... H04B 10/11; H04B 10/532; G02B 27/141; G02B 27/285; G02B 27/286
(Continued)

(56) References Cited

U.S. PATENT DOCUMENTS

| | | | |
|---|---|---|---|
| 5,530,577 | A | 6/1996 | Orino et al. |
| 6,359,712 | B1 | 3/2002 | Kamitani |

(Continued)

FOREIGN PATENT DOCUMENTS

CN    210780813 U    6/2020

OTHER PUBLICATIONS

Samuel et al; Circular Polarization and Availability in Free Space optics (FSO) Communications Systems; 2010; IEEE, pp. 1-6. (Year: 2010).*

(Continued)

*Primary Examiner* — Amritbir K Sandhu
(74) *Attorney, Agent, or Firm* — John A. Miller; Shumaker, Loop & Kendrick, LLP

(57) ABSTRACT

An optical communications system including two communications terminals in communication with each other using optical signals having the same wavelength. Both terminals include a half-wave plate polarizer for rotating linearly polarized optical signals and a quarter-wave plate polarizer for circularly polarizing the optical signals. The quarter-wave plate polarizers are oriented 90° relative to each other so that circularly polarized optical signals sent from one terminal to the other terminal are linearly polarized 90° relative to a transmission polarization orientation to be separable from the transmitted optical signals by a beam splitter.

20 Claims, 2 Drawing Sheets

(51) Int. Cl.
*H04B 10/532* (2013.01)
*G02B 27/14* (2006.01)

(58) Field of Classification Search
USPC .......................................................... 398/118
See application file for complete search history.

(56) References Cited

U.S. PATENT DOCUMENTS

| | | | | |
|---|---|---|---|---|
| 7,277,641 | B1* | 10/2007 | Gleckman | H04B 10/118 |
| | | | | 398/128 |
| 7,675,684 | B1* | 3/2010 | Weissman | G02B 27/0172 |
| | | | | 359/633 |
| 11,009,595 | B1* | 5/2021 | Carlson | G01S 17/08 |
| 2006/0002247 | A1* | 1/2006 | Kim | G11B 7/1374 |
| | | | | 369/44.37 |
| 2009/0122402 | A1* | 5/2009 | Shemo | G02B 5/3083 |
| | | | | 359/486.02 |
| 2011/0007279 | A1* | 1/2011 | Silverstein | H04N 13/337 |
| | | | | 353/8 |
| 2014/0175267 | A1* | 6/2014 | Thiel | H04B 10/11 |
| | | | | 359/326 |
| 2015/0251273 | A1* | 9/2015 | Tayebati | B23K 26/21 |
| | | | | 219/121.72 |
| 2017/0052381 | A1* | 2/2017 | Huang | G02B 27/0927 |
| 2018/0239146 | A1* | 8/2018 | Bierhuizen | G02B 17/0856 |
| 2021/0152681 | A1* | 5/2021 | Yoon | H04N 5/2256 |

OTHER PUBLICATIONS

Angel et al; Circular Polarization and Availability in Free Space Optics (FSO) Communication Systems; 2010; IEEE; pp. 1-6. (Year: 2010).*

Polarization Effects in Optical Free Space Communications; E.B. Gindele and T.L. Miller; 6 pages; 1986 IEEE.

* cited by examiner

OPTICAL FREE SPACE COMMUNICATION APPARATUS USING POLARIZATION

CROSS-REFERENCE TO RELATED APPLICATIONS

This application claims the benefit of the filing date of U.S. Provisional Application 63/115,764, titled, Optical Free Space Communication Apparatus Using Polarization, filed Nov. 19, 2020.

BACKGROUND

Field

This disclosure relates generally to an optical communications system that uses polarized optical beams to allow transmission between terminals at the same beam wavelength and, more particularly, to an optical communications system that uses polarized optical beams to allow transmission between terminals at the same beam wavelength, where the terminals circularly polarize the transmitted beams 90° relative to each other and separate linearly polarized transmitted beams and received beams.

Discussion of the Related Art

Optical communications systems, such as those employed by some satellites, transmit optical signals that contain data and other information between communications terminals on a communications link. The optical signals transmitted by a communications terminal need to be isolated from the optical signals received by the terminal so as to prevent cross-talk therebetween. Further, it is often desirable to limit the number of terminals that are employed in a certain system. Typically this is accomplished by transmitting the optical signals from the terminal at one frequency and receiving optical signals from another terminal at a different frequency along a common boresight between the terminals, where filters and other optical components are employed in the terminals to separate the signals. However, these components that are necessary to separate the signals add size, cost and weight to the overall system. Further, because of these filters and components, each terminal will always need to transmit and receive signals at set wavelengths, which prevents more than two communications terminals at more than two different locations from communicating each other.

DETAILED DESCRIPTION OF THE EMBODIMENTS

The following discussion of the embodiments of the disclosure directed to an optical communications system that uses polarized beams to allow transmission between communications terminals at the same beam wavelength is merely exemplary in nature, and is in no way intended to limit the disclosure or its applications or uses.

Figure 1:
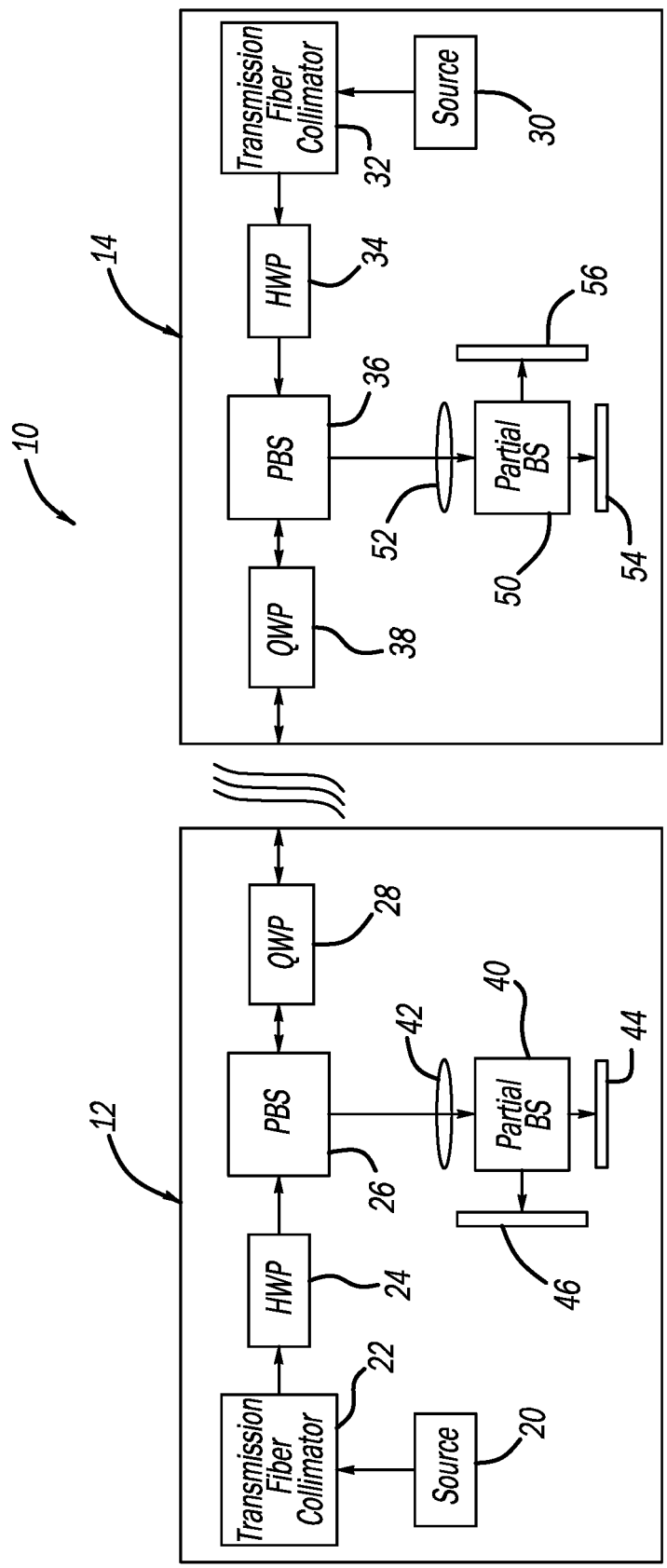
FIG. 1 is a schematic block diagram of an optical communications system including two communications terminals in communication with each other using beams having the same wavelength, but different polarizations, where the same wavelength beam is used for both terminal acquisition and information extraction.

FIG. 1 is a schematic block diagram of an optical communications system 10 including a first communications terminal 12 at one location and a second communications terminal 14 at another location that are in optical communications with each other, where the terminals 12 and 14 can be ground-based terminals or on any suitable platform, such as satellites, aircraft, ships, etc. The terminals 12 and 14 are intended to represent any optical communications terminal that transmit and receive optical signals for any communications purpose. It is noted that none of the components are shown for signal modulation and processing in the terminals 12 and 14, where those components can be any suitable components and would be well understood by those skilled in the art.

The terminal 12 includes an optical source 20 that generates a linearly polarized optical beam having wavelength $\lambda_1$ to be transmitted and provides the beam to a transmission fiber collimator 22. The optical beam from the transmission fiber collimator 22 is sent to a polarizer 24, such as a half-wave plate (HWP) polarizer, that rotates the polarized beam from the fiber collimator 22 in, for example, a P pol direction. The linearly polarized beam is sent to a beam separator 26, such as a polarization beam splitter (PBS) 26, for example, a crystal Brewster angle prism, that passes light straight through in one linearly polarized direction, here the P pol direction, and reflects light that is linearly polarized in an orthogonal direction, such as an S Pol direction. The linearly polarized P pol beam that passes through the beam separator 26 is rotated by a circular polarizing element 28, such as a quarter-wave plate (QWP) polarizer, to be circularly polarized, for example, right hand circularly polarized, and the circularly polarized beam is transmitted to the terminal 14 through free space. It is noted that propagation of the beams through the terminal 12 could be done completely in fiber, where the beam separator 26 could be an optical circulator. Thus, all or some of the polarization control and isolation can be performed within fiber components or free-space components.

Likewise, the terminal 14 includes an optical source 30 that generates an optical beam also having wavelength $\lambda_1$ to be transmitted and provides the beam to a transmission fiber collimator 32. The optical beam from the transmission fiber collimator 32 is sent to a polarizer 34, such as an HWP polarizer, that rotates the polarized beam from the collimator 32 also in, for example, the P pol direction. The linearly polarized beam is sent to a beam separator 36, such as a polarization beam splitter, for example, a crystal Brewster angle prism, that passes light straight through in one linearly polarized direction, here the P pol direction, and reflects light that is linearly polarized in an orthogonal direction, such as the S pol direction. The linearly polarized P pol beam that passes through the beam separator 36 is rotated by a circular polarizing element 38, such as a QWP polarizer, to be circularly polarized, for example, left hand circularly polarized, and the circularly polarized beam is transmitted to the terminal 12 through free space.

The optical beam transmitted by the terminal 12 is received by the circular polarizing element 38 and the optical beam transmitted by the terminal 14 is received by the circular polarizing element 28. The polarization axis of the circular polarizing element 38 is set 90° relative to the polarization axis of the polarizing element 28, where the polarization axis of both of the circular polarizing elements 28 and 38 are switchable between these two orthogonal switching states. Therefore, when the circular polarizing elements 28 or 38 receives the optical beam from the transmitting terminal 14 or 12 it is converted to a linearly polarized beam that is polarized 90° relative to the linear polarization it had before it was converted to a circularly polarized beam in the transmitting terminal 12 or 14. In other words, the switchable orientation states of the circular polarizing elements 28 and 38 that set the orientation of the circular polarizing elements 28 and 38 must be 90° rotated in the receiving terminal 12 or 14 relative to the transmitting terminal 12 or 14, and when the receiving terminal 12 or 14 becomes the transmitting terminal, it must switch this 90° orientation to the original transmitting orientation to enable its transmitted beam to be received by the receiving terminal 12 or 14. This allows the inbound polarization of the optical beam to be orthogonal to the outbound polarization of the optical beam. This can either be done using a mechanically rotating QWP polarizer or a liquid crystal variable retarder to achieve the required phase retardation. The fact that the circular polarizing elements 28 and 38 can be rotated with relatively high tolerance to small angular changes to the incident light passing through the circular polarizing element 28 or 38 without affecting its function in the terminal 12 or 14 enables the circular polarizing element 28 or 38 to be advantageously suited as a gender-switchable element, and enables both mechanical rotation and electronically adjusted liquid crystal retardation to be used for performing this switching function.

The left hand circularly polarized beam transmitted by the terminal 14 is received by the terminal 12 and is linearly polarized by the circular polarizing element 28. Because the polarization axis of the circular polarizing element 38 is set 90° relative to the polarization axis of the circular polarizing element 28, the polarizer 28 polarizes the received beam in the S pol direction that is orthogonal to the P pol direction. The S pol beam is reflected by the beam separator 26 and is directed to a partial beam splitter 40 through a linear polarization filter 42 that filters out any residual light that is not linearly polarized in the S pol direction. The beam splitter 40 splits the beam, and one split beam is sent to a communications sensor 44 to be processed and the information is extracted therefrom and the other split beam is sent to an acquisition sensor 46 to be processed for alignment purposes between the terminals 12 and 14.

Likewise, the right hand circularly polarized beam transmitted by the terminal 12 is received by the terminal 14 and is linearly polarized by the circular polarizing element 38. Because the polarization axis of the circular polarizing element 38 is set 90° relative to the polarization axis of the circular polarizing element 28, the circular polarizing element 38 polarizes the received beam in the S pol direction that is orthogonal to the P pol direction. The S pol beam is reflected by the beam separator 36 and is directed to a partial beam splitter 50 through a linear polarization filter 52 that filters out any residual light that is not linearly polarized in the S pol direction. The beam splitter 50 splits the beam, and one split beam is sent to a communications sensor 54 to be processed and the information is extracted therefrom and the other split beam is sent to an acquisition sensor 56 to be processed for alignment purposes between the terminals 12 and 14.

In the system 10 the same wavelength beam was used for both signal processing and acquisition purposes. However, for some communications systems, the signal intensity may be too low to use the same optical beam for both terminal acquisition and information processing. Further, there may be certain situations where terminals are close together, where one terminal may receive a beam that was intended for the other terminal. In these and other situations it may be desirable to use beams having different wavelengths for signal processing and terminal acquisition.

Figure 2:
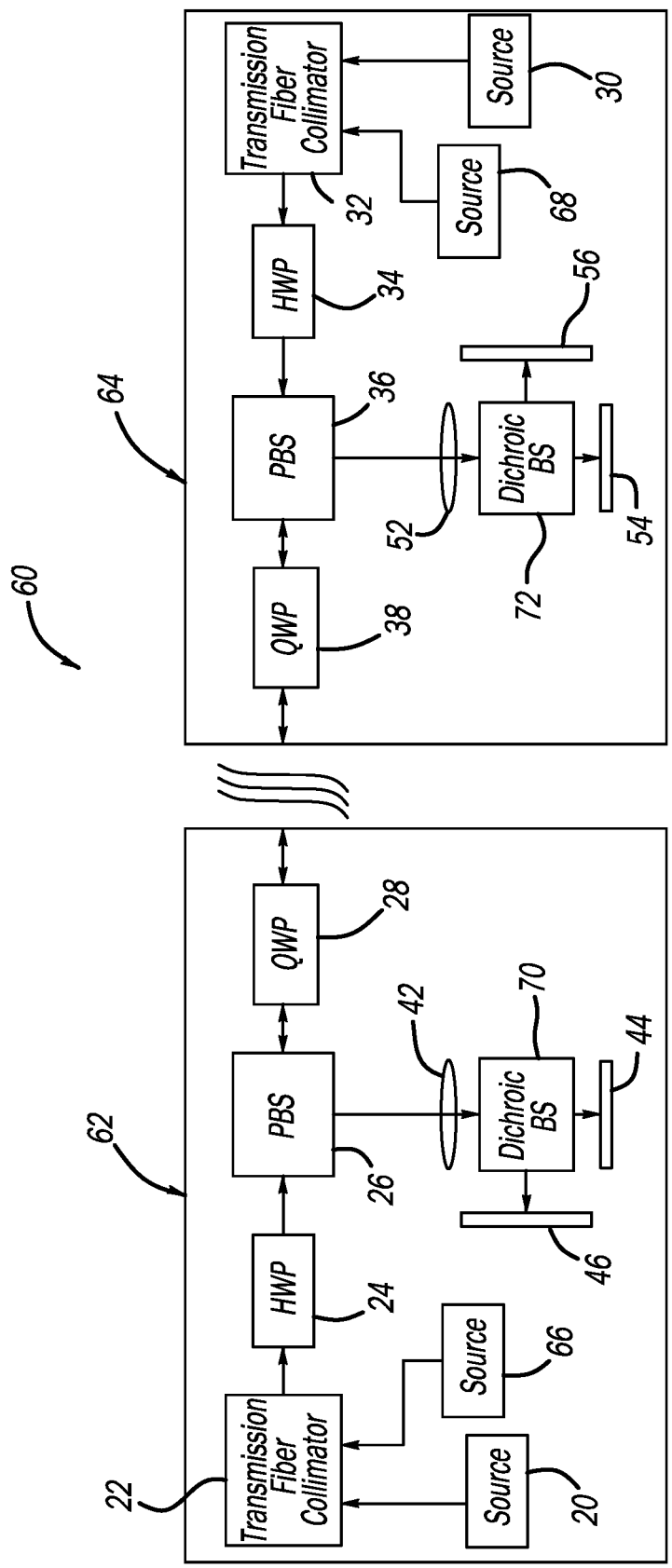
FIG. 2 is a schematic block diagram of an optical communications system including two communications terminals in communication with each other using beams having the same wavelength, but different polarizations, where different wavelength beams are used for terminal acquisition and information extraction.

FIG. 2 is a schematic block diagram of an optical communications system 60 including a first terminal 62 and a second terminal 64 that are in optical communications with each other, where different wavelength beams are used for terminal acquisition and information extraction, or for signal redundancy purposes, and where like elements to the system 10 are identified by the same reference number. In this system 60, a second source 66 in the terminal 62 and a second source 68 in the terminal 64 provide an optical beam at wavelength $\lambda_2$ to the fiber collimators 22 and 32, respectively, that are both processed by the polarizers 24 and 34, the beam separators 26 and 36 and the circular polarizing elements 28 and 38 in the same manner as discussed above. However, the beam received by the terminal 62 and reflected by the beam separator 26 is sent to a dichroic beam splitter 70 that splits the beam based on its wavelength, where the beam having wavelength $\lambda_1$ is sent to the communications sensor 44 and the beam having wavelength $\lambda_2$ is sent to the acquisition sensor 46. Likewise, the beam received by the terminal 64 and reflected by the beam separator 36 is sent to a dichroic beam splitter 72 that splits the beam based on its wavelength, where the beam having wavelength $\lambda_1$ is sent to the communications sensor 54 and the beam having wavelength $\lambda_2$ is sent to the acquisition sensor 56.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. An optical communications system comprising:
   a first terminal operable to transmit and receive optical signals, said first terminal including a first half-wave plate (HWP) polarizer responsive to a first linearly polarized optical beam having a first wavelength and rotating the first linearly polarized optical beam to a first linear direction, a first beam splitter responsive to and passing the first linearly polarized beam, and a first circular polarizing element responsive to the first linearly polarized optical beam from the first beam splitter and circularly polarizing the first beam for transmission, said first circular polarizing element being switchable between two orthogonal switching states, said first terminal further including a second beam splitter, a first acquisition sensor and a first communications sensor; and
   a second terminal operable to transmit and receive optical signals, said second terminal including a second HWP polarizer responsive to a second linearly polarized optical beam having the first wavelength and rotating the second linearly polarized optical beam in the first linear direction, a third beam splitter responsive to and passing the second linearly polarized beam, and a second circular polarizing element responsive to the second linearly polarized optical beam from the third beam splitter and circularly polarizing the second beam for transmission, said second circular polarizing element being switchable between the two orthogonal switching states, said second terminal further including a fourth beam splitter, a second acquisition sensor and a second communications sensor, wherein the first terminal receives the second circularly polarized beam from the second terminal, said first circular polarizing element linearly polarizing the received circularly polarized second optical beam in a second linear direction that is orthogonal to the first linear direction and said first beam splitter directing the second linearly polarized optical beam to the second beam splitter, and wherein the second terminal receives the first circularly polarized optical beam from the first terminal, said second circular polarizing element linearly polarizing the received circularly polarized first optical beam in the second linear direction and said third beam splitter directing the first linearly polarized optical beam to the fourth beam splitter.

2. The system according to claim 1 wherein the second beam splitter and the fourth beam splitter are partial beam splitters that split the first linearly polarized or the second linearly polarized optical beam and direct one split beam to the communications sensor and another split beam to the acquisition sensor.

3. The system according to claim 1 wherein the first terminal further includes a first linear polarization filter that receives the second linearly polarized optical beam from the first beam splitter before the second beam splitter and the second terminal further includes a second linear polarization filter that receives the first linearly polarized optical beam from the third beam splitter before the fourth beam splitter.

4. The system according to claim 1 wherein the first HWP polarizer is responsive to a third linearly polarized optical beam having a second wavelength and rotating the third linearly polarized optical beam in the first linear direction, where the first beam splitter is responsive to and passes the third linearly polarized beam, and the first circular polarizing element is responsive to the third linearly polarized beam from the first beam splitter and circularly polarizing the third linearly polarized optical beam for transmission, and wherein the second HWP polarizer is responsive to a fourth linearly polarized optical beam having the second wavelength and rotating the fourth optical beam in the first linear direction, where the third beam splitter is responsive to and passes the fourth linearly polarized beam, and the second circular polarizing element is responsive to the fourth linearly polarized beam from the third beam splitter and circularly polarizing the third linearly polarized optical beam for transmission, and wherein the first terminal receives the fourth circularly polarized beam from the second terminal, said first circular polarizing element linearly polarizing the received circularly polarized fourth optical beam in the second linear direction and said first beam splitter directing the fourth linearly polarized optical beam to the second beam splitter, and wherein the second terminal receives the third circularly polarized beam from the first terminal, said second circular polarizing element linearly polarizing the received circularly polarized third optical beam in the second linear direction and said third beam splitter directing the third linearly polarized optical beam to the fourth beam splitter.

5. The system according to claim 4 wherein the second beam splitter and the fourth beam splitter are dichroic beam splitters that direct the linearly polarized optical beam having the first wavelength to the communications sensor and direct the linearly polarized optical beam having the second wavelength to the acquisition sensor.

6. The system according to claim 4 wherein the first terminal further includes a first linear polarization filter that receives the second linearly polarized and the fourth linearly polarized optical beams from the first beam splitter before the second beam splitter and the second terminal further includes a second linear polarization filter that receives the first linearly polarized and the third linearly polarized optical beams from the third beam splitter before the fourth beam splitter.

7. The system according to claim 1 wherein the first and second circular polarizing elements are mechanically rotating quarter-wave plate (QWP) polarizers.

8. The system according to claim 1 wherein the first and second circular polarizing elements are liquid crystal variable retarders.

9. The system according to claim 1 wherein the first and second beam splitters are crystal Brewster angle prisms.

10. The system according to claim 1 wherein the first linear direction is a P pol direction and the second linear direction is an S pol direction.

11. The system according to claim 1 wherein the two orthogonal switching states are right hand circular polarization and left hand circular polarization.

12. An optical communications system comprising:
a first terminal operable to transmit and receive optical signals, said first terminal including a first polarization element responsive to a first linearly polarized optical beam having a first wavelength and rotating the first linearly polarized optical beam in a first linear direction, a first beam separator responsive to and passing the first linearly polarized beam, and a first circular polarizing element responsive to the first linearly polarized beam from the first beam separator and circularly polarizing the first linearly polarized optical beam for transmission, said first circular polarizing element being switchable between two orthogonal switching states; and
a second terminal operable to transmit and receive optical signals, said second terminal including a second polarization element responsive to a second linearly polarized optical beam having the first wavelength and rotating the second linearly polarized optical beam in the first linear direction, a second beam separator responsive to and passing the second linearly polarized beam, and a second circular polarizing element responsive to the second linearly polarized optical beam from the second beam separator and circularly polarizing the received circularly polarized second optical beam for transmission, said second circular polarizing element being switchable between the two orthogonal switching states, wherein the first terminal receives the second circularly polarized beam from the second terminal, said first circular polarizing element linearly polarizing the received circularly polarized second optical beam in a second linear direction that is orthogonal to the first linear direction and said first beam separator directing the second linearly polarized optical beam in a direction away from the first polarization element, and wherein the second terminal receives the first circularly polarized beam from the first terminal, said second circular polarizing element linearly polarizing the received circularly polarized first optical beam in the second linear direction and said second beam separator directing the received circularly polarized first optical beam in a direction away from the second polarization element.

13. The system according to claim 12 wherein the first and second polarization elements are half-wave plate (HWP) polarizers.

14. The system according to claim 12 wherein the first and second circular polarizing elements are mechanically rotating quarter-wave plate (QWP) polarizers.

15. The system according to claim 12 wherein the first and second circular polarizing elements are liquid crystal variable retarders.

16. The system according to claim 12 wherein the first and second beam separators are polarization beam splitters.

17. The system according to claim 16 wherein the first and second polarization beam splitters are crystal Brewster angle prisms.

18. The system according to claim 12 wherein the first and second beam separators are optical circulators.

19. The system according to claim 12 wherein the first linear direction is a P pol direction and the second linear direction is an S pol direction.

20. The system according to claim 12 wherein the two orthogonal switching states are right hand circular polarization and left hand circular polarization.

\* \* \* \* \*